United States Patent

Satyapal et al.

[11] Patent Number: 6,149,717
[45] Date of Patent: Nov. 21, 2000

[54] ELECTRONIC AIR CLEANER WITH GERMICIDAL LAMP

[75] Inventors: Sunita Satyapal, East Hampton; Antonio Rinaldi, Wethersfield; Robert J. Hall, West Hartford; Laurence R. Boedeker, West Simsbury, all of Conn.

[73] Assignee: Carrier Corporation, Syracuse, N.Y.

[21] Appl. No.: 09/218,654

[22] Filed: Dec. 22, 1998

Related U.S. Application Data

[63] Continuation-in-part of application No. 08/779,315, Jan. 6, 1997, Pat. No. 5,879,435.

[51] Int. Cl.$^7$ .................................................. B03C 3/011
[52] U.S. Cl. ......................... 96/16; 96/28; 96/58; 96/224
[58] Field of Search ................................. 96/16, 28, 223, 96/224, FOR 175, 55, 57, 58; 95/57, 68, 69, 74, 901; 422/24, 121

[56] References Cited

U.S. PATENT DOCUMENTS

| | | | |
|---|---|---|---|
| 2,418,339 | 4/1947 | Ehrgott | 96/16 |
| 2,449,681 | 9/1948 | Wilson | 96/16 |
| 2,651,383 | 9/1953 | Yonkers, Jr. | 96/16 |
| 2,709,954 | 6/1955 | Baker | 96/16 X |
| 3,313,971 | 4/1967 | Nagy | 96/16 X |
| 3,744,216 | 7/1973 | Halloran | 96/16 |
| 3,798,879 | 3/1974 | Schmidt-Burbach et al. | 96/16 |
| 3,910,778 | 10/1975 | Shahgholi et al. | 96/16 |
| 4,102,654 | 7/1978 | Pellin | 96/16 |
| 4,203,948 | 5/1980 | Brundbjerg | 96/16 X |
| 4,750,917 | 6/1988 | Fujii | 95/69 |
| 5,185,015 | 2/1993 | Searle | 422/121 X |
| 5,225,000 | 7/1993 | Fujii et al. | 96/16 X |
| 5,330,722 | 7/1994 | Pick et al. | 96/16 X |
| 5,492,557 | 2/1996 | Vanella | 96/16 |
| 5,755,103 | 5/1998 | Na et al. | 62/78 |
| 5,879,435 | 3/1999 | Satyapal et al. | 96/16 |
| 5,993,738 | 11/1999 | Goswani | 422/22 |
| 6,019,815 | 2/2000 | Satyapal et al. | 95/74 |

FOREIGN PATENT DOCUMENTS

| | | | |
|---|---|---|---|
| 677658 | 1/1964 | Canada | 96/16 |
| 406198215 | 7/1994 | Japan | 96/16 |
| 931625 | 7/1963 | United Kingdom | 96/16 |

OTHER PUBLICATIONS

Carrier Brochure, Catalog No. 533–100, Printed In U.S.A., Form 31KAX–I0SI, Dated Oct. 1, 1994, pp. 1–14, 31KAX Electronic Air Cleaners, Installation, Start–Up, And Service Instructions.

*Primary Examiner*—Richard L. Chiesa
*Attorney, Agent, or Firm*—William W. Habelt

[57] ABSTRACT

An electronic air cleaner (10) includes a housing (20), a mechanical prefilter (30), an electrostatic precipitator cell (40) and at least one germicidal lamp (50). The electrostatic precipitator cell (40) includes a plurality of collector plates (42) for collecting thereon particulate material from the air stream. The germicidal lamp or lamps (50) are disposed to irradiate the collector plates (42) and any particulate material collected thereon with germicidal light to destroy microbial growth that might occur on the particulate material deposited on the collector plates. Reflectors (60) may be provided in operative association with the germicidal lamp or lamps (50) to concentrate the germicidal light unto the collecting surface of the collector plates (42). A post filter (90), disposed downstream with respect to air flow of the lamp or lamps (50), is provided to remove volatile organic compounds from the air flow.

17 Claims, 6 Drawing Sheets

ELECTRONIC AIR CLEANER WITH GERMICIDAL LAMP

CROSS-REFERENCE TO RELATED APPLICATION

This application is a continuation in part of commonly assigned, application Ser. No. 08/779,315, filed Jan. 6, 1997 now U.S. Pat. No. 5,879,435.

BACKGROUND OF THE INVENTION

The present invention relates generally to air purification and, more particularly, to electronic air cleaners for use with residential and light commercial forced-air heating and/or cooling systems.

Conventional commercially available electronic air cleaners typically comprise a plurality of ionizer wires, a plurality of collector plates and an associated power circuit for supplying high voltage DC power to the ionizer wires and the collector plates. The ionizer wires are typically tungsten wires that receive a positive charge from the power source. The collector plates comprise a series of spaced, parallel plates alternately charged positive and negative by the power source. The power circuit includes a transformer for converting standard 120 volt or 240 volt alternating current power to high voltage direct current power, for example about 6000 vdc to 12000 vdc.

In operation, particles, including for example household and atmospheric dust, lint, animal dander, food particles, tobacco smoke, aerosols, pollen, plant spores, and the like are ionized with a positive charge as the particles pass through the electrostatic field established by the ionizing wires. The charged particles thereafter are drawn to and deposited upon the negatively charged collector plates as the air flow in which the particles are entrained passes through the array of spaced, alternatively charged collector plates. Typically, a mechanical pre-filter is disposed upstream with respect to air flow of the ionizer wires to remove larger particles, for example particles having a mean diameter greater than 10 microns. The electrostatic cell portion of the air cleaner can remove particles as small as 0.01 microns in mean diameter.

While such conventional electrostatic precipitator type air cleaners are quite effective in trapping dust and other particles on the collector plates, if the plates are not cleaned regularly to remove the deposited particles, there may be potential for microbial growth on the particles on the collector plates. If microbial growth is present and is not removed through regular cleaning, there is the possibility that bioaerosols such as fungal spores, bacteria and other allergens may be re-entrained into the air stream and circulated back into the occupied enclosure.

U.S. Pat. No. 3,744,216 discloses an air cleaner for purifying air in rooms of a home, office or other building. The disclosed air cleaner includes a mechanical particulate filter, a deodorizing filter, germicidal lamps and an electrostatically enhanced media filter. The germicidal lamps comprise a pair of ultraviolet lamps for irradiating the air upstream of the electrostatically enhanced media filter to kill bacteria, fungus spores, viruses and the like. The ultraviolet lights are disposed across from each other on opposite sides of the cleaner housing and are provided with shields so as to direct the ultraviolet light rays towards each other across the path of the air flowing through the air cleaner so as to irradiate the airborne microbes. As the efficacy of microbal deactivation by the ultraviolet light rays is dependent upon the residence time of the microbes in the air stream to exposure to the ultraviolet light, increasing the time that the microbes are exposed to the ultraviolet light is desirable.

SUMMARY OF THE INVENTION

It is an object of the present invention to prevent microbial growth on the collector plates of an electronic cleaner.

It is a further object of the present invention to provide an improved electronic air cleaner having germicidal lamps for irradiating the collector plates.

It is an object of one aspect of the present invention to provide an improved electronic air cleaner having reflector means for directing germicidal light to irradiate the collector plates of an electrostatic precipitator cell.

It is an object of another aspect of the present invention to provide an improved electronic air cleaner having a filter for removing bioaersols from the air flow through an electrostatic precipitator cell.

The air clearer of the present invention includes an electrostatic precipitator cell having a plurality of collector plates for collecting thereon particulate material from the air stream and at least one germicidal lamp, disposed downstream with respect to gas flow of the collector plates, for irradiating the collector plates and any particulate material collected thereon with germicidal light. The light from the germicidal lamp or lamps, advantageously ultraviolet light having a wavelength in the range of 200 to 280 nanometers (nm), and optimally from 245 to 265 nm, is effective not only in killing microbes entrained in the air stream, but also in killing microbial growth that might occur on the plates and on the particulate material deposited on the collector plates.

In an embodiment of the present invention, at least one light reflecting element is disposed upstream with respect to airflow of the germicidal lamp for redirecting germicidal light having passed through the array of collector plates in a generally downstream direction to irradiate back upon the collector plates. Additionally, at least one light reflecting element may be disposed downstream with respect to airflow of the collector plates for directing germicidal light emitted from the lamp in a generally downstream direction to irradiate upon said collector plates at an angle of incidence. The upstream reflector may comprise a plurality of relatively narrow, thin, laterally spaced light reflecting strips disposed at an acute angle with a longitudinal axis extending parallel to the collector plates so as to redirect the germicidal light to irradiate upon the collector plates. The at least one downstream reflector may comprise an elongated flat or arcuate plate disposed in operative association with a germicidal lamp.

In an embodiment of the present invention, a particulate prefilter for trapping relatively large particles is disposed axially upstream with respect to air flow of the ionizer wires. Advantageously, the prefilter is formed of a plurality of laterally spaced light reflecting mesh elements disposed at an acute angle with a longitudinal axis parallel to the collector plates so as to redirect the germicidal light having passed through the array of collector plates in a generally downstream direction to irradiate back upon the collector plates. Each light reflecting element may be formed of polished aluminum mesh having a relatively high reflectivity for light at wavelengths between 200 and 280 nanometers.

In another embodiment of the present invention, an air cleaner is provided including a housing having an air stream inlet, an air stream outlet, and defining a flow passage extending therebetween and an electrostatic precipitator cell including a plurality of collector plates, disposed within the flow passage and arrayed substantially parallel to the longitudinal axis through the housing, for collecting thereon particulate material from the air stream, said collector plates. At least one germicidal lamp operative to emit germicidal light is disposed within said housing for irradiating the collector plates with germicidal light. A filter for removing bioaersols, such as for example volatile organic compounds and odors, in the airflow is disposed downstream with respect to airflow of the germicidal lamp, either within or outside the housing. Advantageously, a catalyst, such as for example a photocatalyst responsive to ultraviolet light, may be incorporated into the media of the filter.

BRIEF DESCRIPTION OF THE DRAWINGS

Further objects and advantages of the present invention will be apparent from the following description of an exemplary embodiment of the present invention wherein reference is made to the accompanying drawings, wherein.

DETAILED DESCRIPTION OF A PREFERRED EMBODIMENT

The present invention is described herein incorporated in an electronic air cleaner of the type commonly installed in connection with residential central air cooling and heating systems. It is to be understood, however, that the particular embodiments described herein are meant to be exemplary and that present invention may be used in connection with electronic air cleaners for other applications such as, for example, portable room air cleaners, office air purification systems, central air cooling and/or heating systems for commercial buildings, hospitals, schools, libraries, museums and other buildings.

Referring now to the drawings, there is depicted therein an electronic air cleaner 10 having a housing 20 and an electrostatic precipitator cell 40 disposed therein. The housing 20 has an air stream inlet 22, an air stream outlet 24 and an air flow passageway 25 extending therebetween bounded by perimeter walls 44. Air from the enclosure enters the air cleaner 10 through inlet 22, traverses the air flow passageway 25, and exits the air cleaner 10 through outlet 24. In a residential central air heating and/or cooling system, the electronic air cleaner 10 may be installed upstream with respect to air flow of the induced flow fan (not shown) such that the air flow is drawn through the air cleaner 10 and thence into the furnace or air conditioner of the system.

The electrostatic precipitator cell 40 depicted in FIGS. 1–6 exemplifies a conventional electrostatic precipitator cell of the type commercially available from Carrier Corporation for use in residential central air heating and cooling systems. The electrostatic precipitator cell 40 comprises a plurality of alternately charged collector plates 42 disposed in spaced relationship in a parallel array axially aligned with the central longitudinal axis 27 through the air flow passageway 25. The collector plates 42 are alternately positively charged and negatively charged by a power supply. The collector plates 42 are constructed of a conductive metal, such as aluminum or steel, and have a relatively high surface reflectivity. For example, on the model 31KAX020 electronic air cleaner marketed by Carrier Corporation for use in connection with gas-fired residential hot air furnaces, the collector plates are about four inches by seventeen inches in dimension and are disposed in a parallel array at spacings of about ¼ inch.

The electrostatic precipitator cell 40 also includes a plurality of ionizer wires 46 disposed at spaced intervals cross the width of the housing with one ionizer wire disposed intermediate each pair of neighboring collector plates 42 and positioned axially upstream with respect to air flow of the array of collector plates 42. The ionizer wires 46 conventionally comprise tungsten wires that receive a positive charge from the power supply pack. Each of the ionizer wires 46 generates a positive corona discharge across the electrostatic precipitator cell 40 upstream of the array of collector plates 42 so that dust particles entrained in the air flow passing through the air flow passageway 25 receive a positive electric charge. When these positively charged dust particles subsequently traverse the array of collector plates 42, the positively charged dust particles are directed toward and collected on the negatively charged collector plates. In the aforementioned model 31KAX020 electronic air cleaner, the ionizer wires are disposed in a row positioned about ¾ inch upstream of the leading edge of the array of collector plates and are spaced in that row at about 1¼ inch intervals.

As in conventional electrostatic precipitator cells, a conventional type power supply (not shown) is provided having a supply circuit including a device for converting standard 120 volt or 240 volt alternating current power to high voltage direct current power. The output of the power supply pack may range from 6000 vdc to 12000 vdc depending upon the application, but typically is in the range of 7000 vdc to 7500 vdc for residential applications.

The electronic air cleaner 10 includes at least one germicidal lamp 50 operative to emit germicidal light, such as for example ultraviolet light having a wavelength in the range of 200 to 280 nanometers (nm), and optimally from 245 to 265 nm. The germicidal lamp or lamps 50 are disposed within the housing 20 so as to irradiate the surface of the collector plates 42 with germicidal light. Advantageously, the germicidal lamp or lamps 50 are disposed downstream with respect to air flow of the electrostatic precipitator cell 40. So positioned, the lamp or lamps 50 will not be exposed to the higher particulate loadings in the gas flow upstream of the electrostatic precipitator cell 40 and the potential clouding of the lamps due to particulate buildup thereon. Further, positioned downstream of the electrostatic precipitator cell 40, the lamps will not interfere with and distort the distribution of the air flow entering the electrostatic precipitator cell 40. Nevertheless, if circumstances dictate, the germicidal lamp or lamps 50 may be positioned upstream of the electrostatic precipitator cell 40 so long as the germicidal light emitted therefrom is directed so as to irradiate the surface of the collector plates 42.

Figure 1:
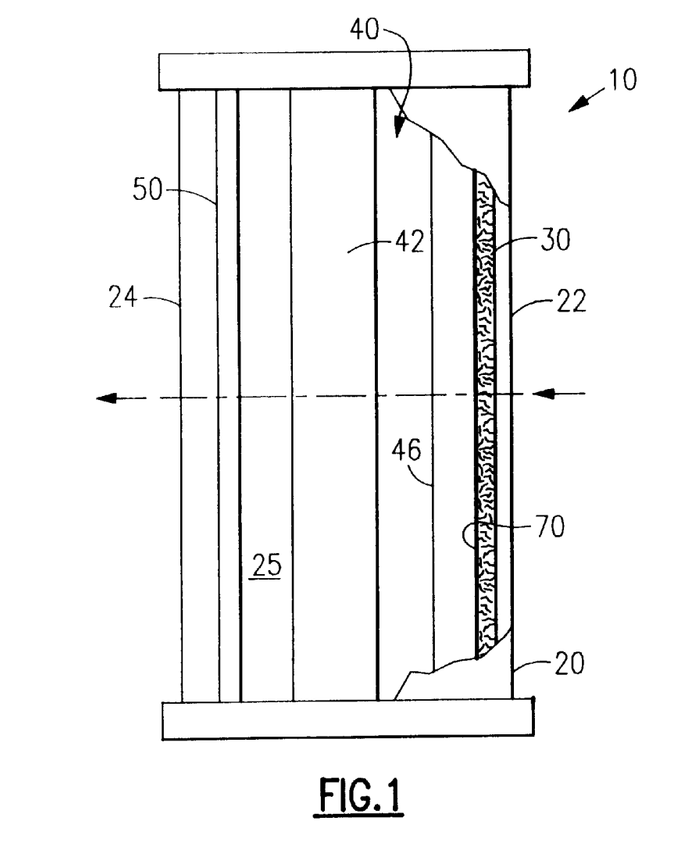
FIG. 1 is a side elevation view, partly in section, of an electronic air cleaner provided with a plurality of germicidal lamps in accordance with a first embodiment of the present invention.
Figure 2:
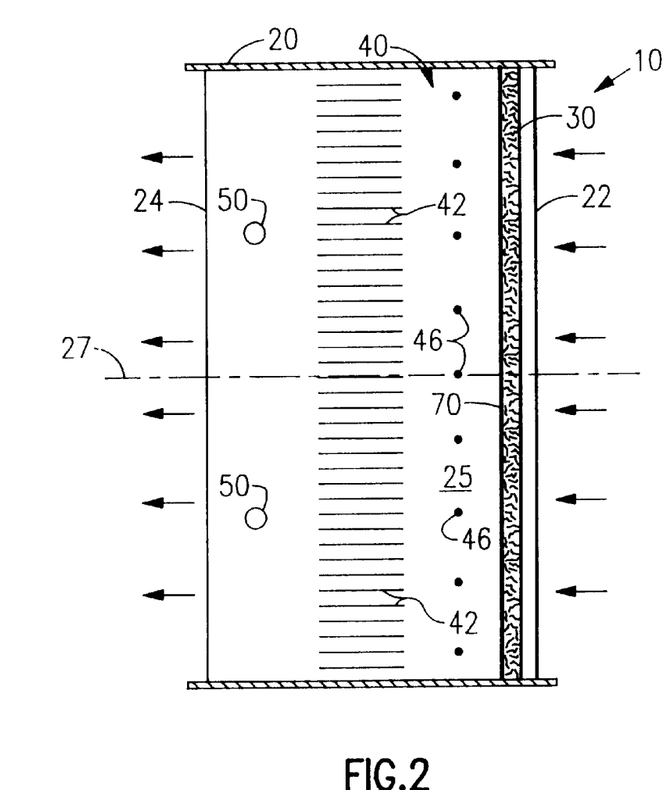
FIG. 2 is a plan view of the electronic air cleaner illustrated in FIG. 1.
Figure 5:
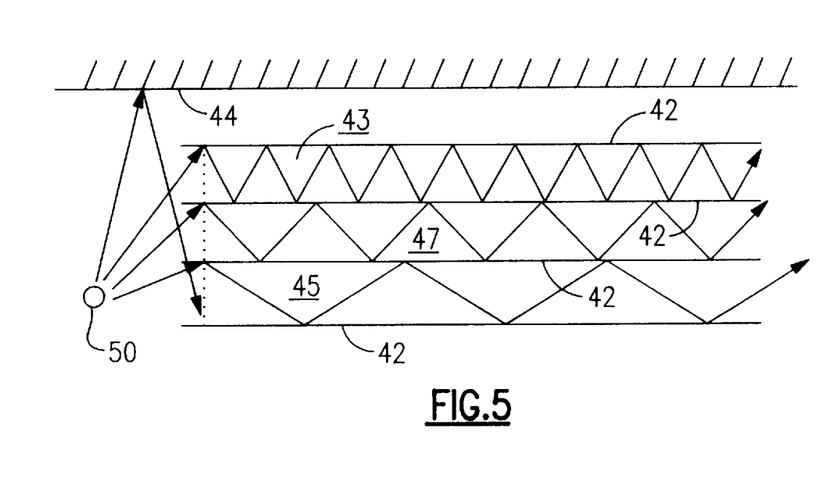
FIG. 5 is a diagrammatic illustration of the reflection of germicidal light rays between neighboring collector plates.
Figure 6:
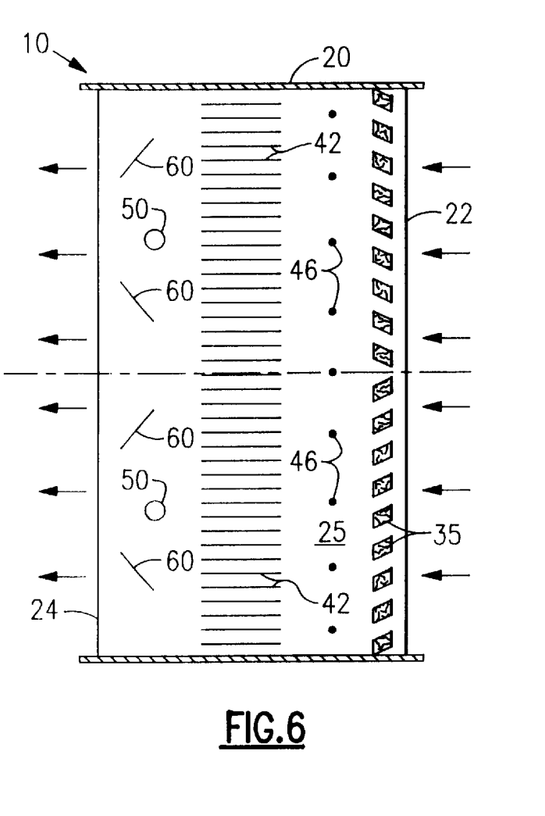
FIG. 6 is a plan view of an alternate embodiment of the multiple lamp embodiment of the electronic air cleaner of the present invention of FIG. 1.

In one embodiment of the electronic air cleaner 10 of the present invention, as illustrated in FIGS. 1, 2 and 6, a pair of laterally spaced germicidal lamps 50 are disposed within the housing 20 downstream with respect to air flow of the electrostatic precipitator cell 40. One of the germicidal lamps 50 is laterally displaced to one side of the central longitudinal axis 27 through the air flow passage 25, while the other of the germicidal lamps 50 is laterally displaced to the other side of the central longitudinal axis 27 through the air flow passage 25. With the paired germicidal lamps 50 positioned in this manner, that is positioned off center from the longitudinal central axis 27 of the air flow passageway 25, most of the rays of germicidal light from the lamps 50 will first impinge upon the respective collector plates 42 at a variety of angles of incidence. As a result, the respective rays of germicidal light will be reflected again and again between the opposed surfaces of neighboring collector plates 42 as the respective rays of germicidal light traverse the gap between a respective pair of neighboring collector plates 42 as shown in FIG. 5. Collector plates made of aluminum will typically have a high reflectivity over the required wavelength range. Collector plates formed from lower reflectivity metal, for example steel collector plates, may need to be coated with a reflective material to increase the reflectivity of the collector plates.

The repeated reflection of the germicidal light rays between the opposed surfaces of neighboring collector plates will ensure that the entire surface area of each collector plate is bathed with germicidal light. As illustrated in FIG. 5, the number of reflections generated is dependent upon the angle of incidence of the germicidal light incoming into the array of spaced collector plates 42. Measuring the angle of incidence from the perpendicular to the plate, for small angles of incidence, as illustrated in the air flow passage 43, there will be a larger number of reflections between the plates. With a larger number of reflections, there is greater direct contact of the germicidal light with the collecting surface of the plates as the light traverses the plates, but the intensity of the light will decrease to a greater extent as the light traverses the air flow passage between the plates due to the larger number of reflections. On the other hand, for large angles of incidence, as illustrated in the air flow passage 45, there will be a smaller number of reflections between the plates. With a smaller number of reflections, there is lesser direct contact of the germicidal light with the collecting surface of the plates as the light traverses the plates, but the intensity of the light will decrease to a lesser extent as the light traverses the air flow passage between the plates. With a moderate angle of incidence, as illustrated in the air flow passage 47, there will be a moderate number of reflections and only a moderate decrease in the intensity of the light as it traverses the air flow passage between the plates.

Figure 3:
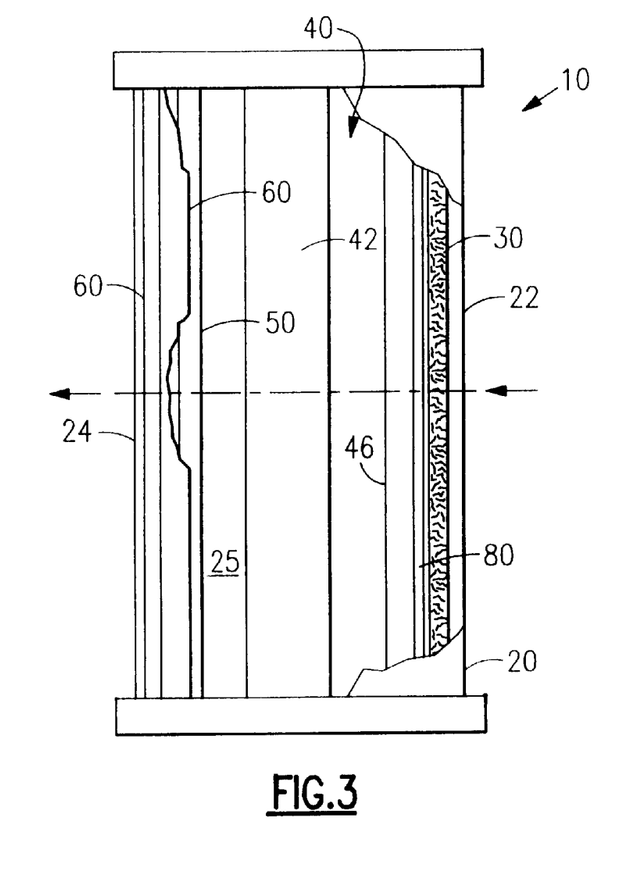
FIG. 3 is a side elevation view, partly in section, of an electronic air cleaner provided with a single germicidal lamp in accordance with a second embodiment of the present invention.
Figure 4:
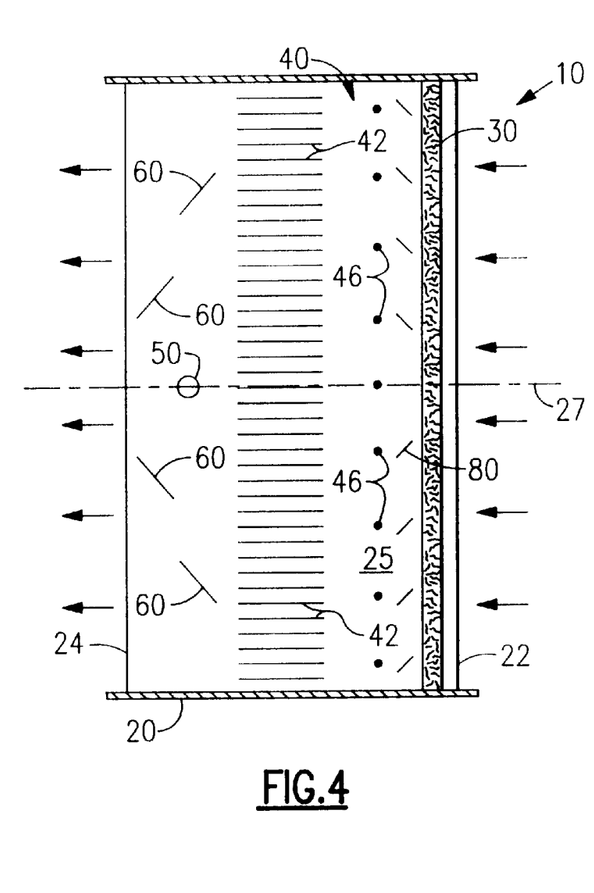
FIG. 4 is a plan view of the electronic air cleaner illustrated in FIG. 3.

Referring now to FIGS. 3 and 4, there is depicted another embodiment of the electronic air cleaner 10 of the present invention including a single germicidal lamp 50. As illustrated, the single germicidal lamp 50 is disposed within the housing 20 along the central axis 27 of the air flow passageway 25 at a location spaced downstream from the electrostatic precipitator cell 40. To improve the distribution of the germicidal light emitted from the single lamp 50 across the lateral expanse of the electrostatic precipitator cell 40, at least one, and advantageously a series of reflectors 60, may be provided in operative association with the germicidal lamp 50 for reflecting those rays of germicidal light originally emitted from the germicidal lamp 50 but initially directed away from the collector plates 42. The reflectors 60 are made of a reflective material, such as aluminum or steel, or are otherwise provided with a highly reflective surface, for example coated with a highly reflective material. Although the particular shape and dimensions of the reflectors 60 may vary depending upon application, the reflectors 60 may typically comprise elongated plates having a longitudinal dimension that approximately corresponds to the longitudinal dimension of the collector plates and that are aligned with their longitudinal axis parallel to the longitudinal axis of the collector plate array, but disposed with their lateral axis at an angle to the central longitudinal axis 27 of the flow passage 25, as illustrated in FIG. 4, to facilitate reflection of the germicidal light unto the face surfaces of the collector plates 42. The reflectors 60 may comprise elongated rectangular flat plates or may comprise elongated rectangular arcuate plates, such as for example plates having a parabolic, cylindric or other curved contour, having a curvature designed to direct the reflected germicidal light rays back upon the collector plates so as to yield a desired distribution across the trailing edge of the collector plate array.

The reflectors 60, which advantageously are, as depicted, disposed downstream with respect to air flow and laterally spaced from the lamp 50, serve to redirect these rays towards the collector plates 42, disposed upstream with respect to air flow past the lamp 50, thereby increasing the overall level of germicidal light radiating upon the collector plates 42. The reflectors 60 also reflect the germicidal light rays to impinge against the collecting surface of the respective collector plates at a wider variety of angles of incidence, whereby multiple reflections at a variety of angles of incidence will occur between the opposed surfaces of neighboring collector plates as hereinbefore discussed and illustrated in FIG. 5. Additionally, the perimeter walls 44 bounding the air flow passage 25 may advantageously be formed of or coated with a light reflective material to provide a light reflective surface for further enhancing the reflection of the germicidal light rays at a wider variety of angles of incidence.

It is to be understood that reflectors may also be used in connection with the multiple germicidal lamp embodiment of the electronic air cleaner 10 of the present invention. A pair of reflectors 60 could be disposed downstream with respect to air flow and in operative association with each of the germicidal lamps 50 of the multiple germicidal lamp embodiment, with the reflectors oriented to reflect germicidal light rays back toward the collector plates 42, as for example depicted in FIG. 6. Again, the use of reflectors 60 will result in multiple reflections at a variety of angles of incidence occurring between the opposed surfaces of neighboring collector plates as hereinbefore discussed and illustrated in FIG. 5. Also, to minimize losses from absorption in the walls 44 defining the air flow passageway 25 through the electrostatic precipitator cell 40, a high reflectivity coating may be applied to each wall, so that UV light photons are reflected toward the plates 42.

A mechanical filter 30 may be disposed adjacent the inlet 22 upstream of the electrostatic precipitator cell 40 to prefilter the air stream passing into the air cleaner 10 to remove large particles. The depth of the mechanical filter 30 in the axial direction, i.e. in the direction of air flow along the central longitudinal axis 27, as well as the density of the mesh media, are selected to provide a desired particulate collection efficiency while ensuring a pressure drop that is below a desired maximum design pressure drop at normal air flow capacity. The mechanical filter 30 may be a media filter, a fabric filter or other type of conventional mechanical filter that is functional to remove relatively large particles, such as lint, pollen and other particles having a mean particle diameter greater than about 10 microns, prior to the air flow entering the electrostatic precipitator cell 40.

In either the single lamp or multiple lamp embodiments, means for reflecting germicidal light is disposed upstream with respect to gas flow of the collector plates 42 germicidal light having traversed the array of collector plates back downstream to irradiate upon the surface of the collector plates and any particulate material deposited thereupon. In the embodiment depicted in FIGS. 1 and 2, the means for reflecting germicidal light comprises a high reflectivity surface 70 provided on the downstream surface 33 of the mechanical filter 30 to reflect germicidal light that has traversed the array of collector plates 42 back at the collector plates. Advantageously, the mechanical filter 30 may comprise a mesh filter wherein the mesh fiber is aluminum, steel or other high reflectivity material, whereby the mechanical filter 30 itself acts as a reflector.

In another embodiment of the present invention depicted in FIG. 6, the mechanical filter 30 may comprise a plurality of elements 35 of expanded mesh filter media made of a high reflectivity material, advantageously a material having a high reflectivity over the range of 200 to 280 nanometers, such as for example highly polished aluminum. The elements 35 are disposed upstream with respect to airflow of the ionizer wires and the electrostatic precipitator cell 40 in a lateral array across the flow passage through the housing. Most advantageously, the elements 35 may be arranged to extend parallel to the collector plates and at appropriate acute angles with the longitudinal axis through the housing whereby the germicidal light having traversed the array of collector plates is reflected from the respective surfaces of the elements 35 back in a downstream direction to re-irradiate upon the surface of the collector plates. In this manner, the overall irradiation of the surfaces of the collector plates 42 is further optimized and the efficiency of sterilizing microbial growth on the surfaces of the collector plates 42 is enhanced.

In electronic air cleaners having a mechanical filter 30 that is a fabric filter or media filter that is made of a material having little or no reflectivity with respect to the germicidal light, additional reflector strips 80 may be positioned upstream of the electrostatic precipitator cell 40 at a location downstream of the mechanical filter 30 to redirect rays of germicidal light that have traversed the array of collector plates 42 back at the collector plates 42. The reflectors 80 are made of a reflective material, such as aluminum or steel, or are otherwise provided with a highly reflective surface, for example coated with a highly reflective material. Although the particular shape and dimensions of the reflectors 80 may vary depending upon application, the reflectors 80 may typically comprise relatively narrow, thin, longitudinally elongated rectangular plates having a longitudinal dimension that approximately corresponds to the longitudinal dimension of the collector plates and that are aligned with their longitudinal axis parallel to the longitudinal axis of the collector plate array, but disposed with their lateral axis at an angle to the central axis 27 of the flow passage 25, as illustrated in FIG. 6, to facilitate reflection of the germicidal light having traversed the array of collector plates 42 unto the face surfaces of the collector plates 42. The reflectors 80 may comprise flat plates or may comprise accurate plates having a curvature designed to further direct the reflected germicidal light rays back upon the collector plates.

Figure 7:
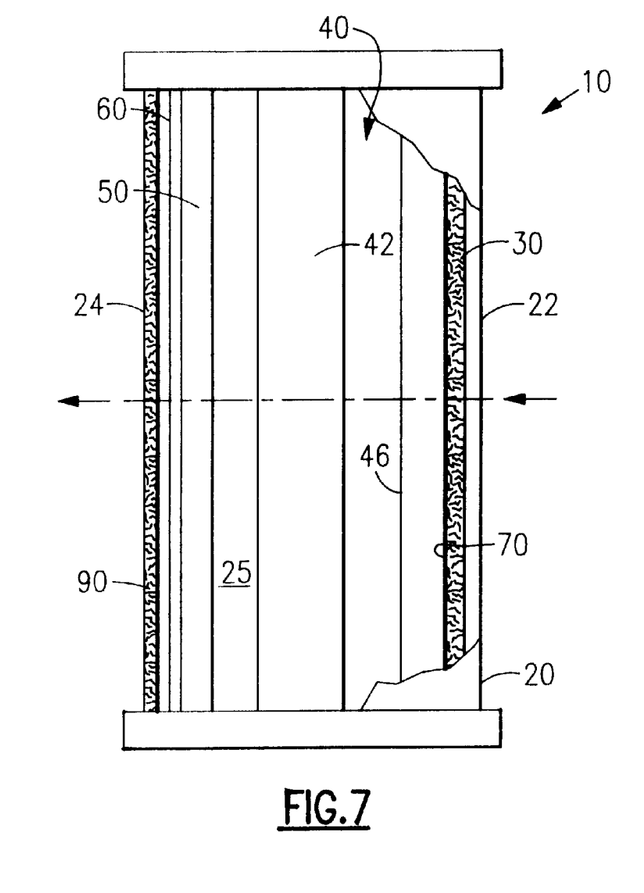
FIG. 7 is a side elevation view, partly in section, of an electronic air cleaner provided with a plurality of germicidal lamps in accordance with another embodiment of the present invention.
Figure 8:
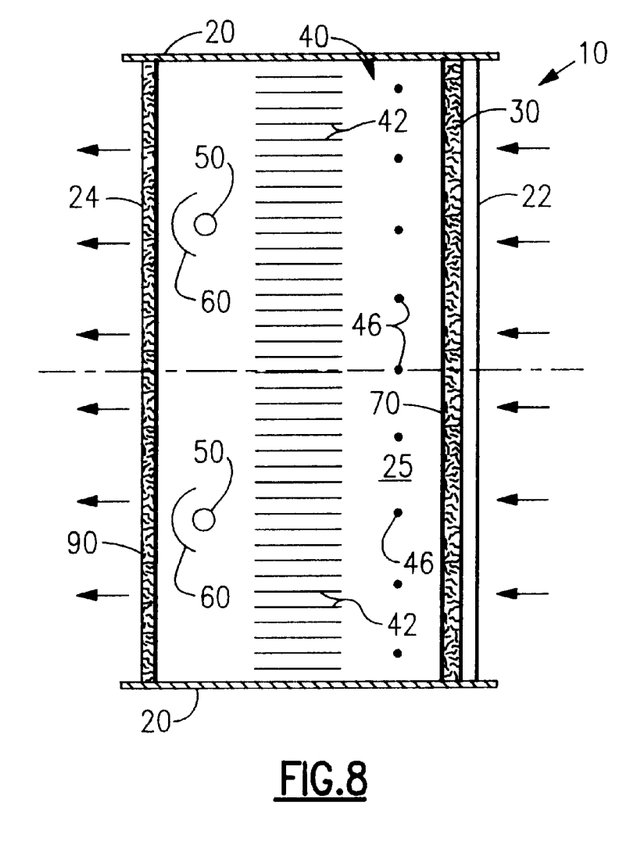
FIG. 8 is a plan view of the electronic air cleaner illustrated in FIG. 7.

In the embodiment of the present invention depicted in FIGS. 7 and 8, a post filter 90 is disposed downstream with respect to air flow through the passageway 25 of the ultraviolet lights 50, and reflectors 60, if installed, near the outlet 24, either within or outside of the housing 20. The filter 90 is operative to remove volatile organic compounds (VOC) and odors in the air flow. Advantageously, the post filter 90 may comprise an absorption filter such as a carbon based filter, for example a filter media containing activated carbon. Ultraviolet light from the lamps 50 irradiating onto the filter 90 will also desorb and decompose adsorbed contaminants collected by the filter 90. Additionally, a catalyst may be incorporated into the media of the filter 90 to enhance degradation of collected contaminants. For example, a photocatalyst that responds to ultraviolet light would be particularly advantageous for incorporation into the media of filter 90, particularly on the upstream surface thereof. In the presence of the ultraviolet light, the photocatalyst would enhance cleaning of the filter 90, on either a continuous or pulsed basis, by promoting degradation of the collected contaminants. In the pulsed cleaning mode, the air flow could be selectively diverted to a waste vent for releasing the desorbed or degraded products.

In operation, when the power supply is activated to charge the collector plates 42 and the ionizer wires 46, particles entrained in the air flow passing through the electronic air cleaner 10 will be captured on the collecting surfaces of the collecting plates 42. As the particles entrained in the air are captured, layers of particulate will build up over time on the collecting surfaces of the collector plates 42. In a conventional residential hot air heating system installation, the electrostatic precipitator cell 40 is not operated continuously, but rather is only operated when air flow is passing therethrough, that is when the system furnace is actually in operation or the system fan is operating to circulate air. In carrying out the present invention, the germicidal lamp or lamps 50, as the case may be, may be operated in a mode in which the lamp or lamps 50 illuminate the collector plates 42 when the electrostatic precipitator 40 is in operation or in a mode in which the lamp or lamps 50 illuminate the collector plates 42 only at a time when the electrostatic precipitator 40 is not in operation. When the lamp or lamps 50 are operated in concert with the electrostatic precipitator 40, the collector plates 42 are bathed with germicidal light as the particulate material builds up on the collector plates 42. At least a portion of germicidal light from the lamp or lamps 50 that has traversed the array of collector plates 42 is reflected back by the upstream reflecting means of the present invention to irradiate upon the collector plates 42 and any particulate material collected thereon.

Figure 9:
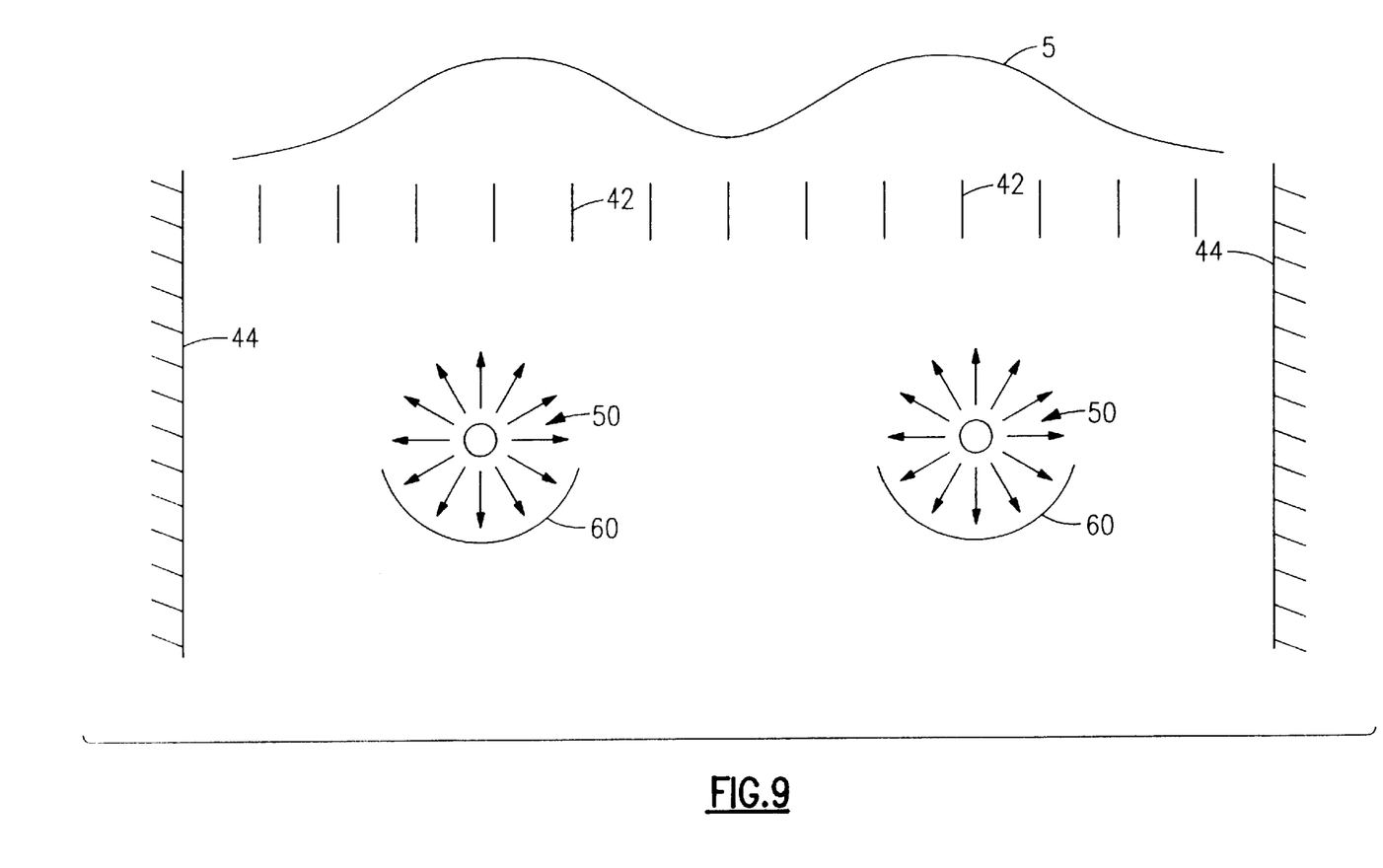
FIG. 9 is a graphical illustration representative of the light illumination profile across the trailing edge of the collector plate array for the depicted light arrangement.

The UV disinfection rate of microbes collected on the EPS plates depends on the intensity of UV light incident on the plate surfaces. From intensity, a doseage can be calculated using known techniques. Disinfection is related to doseage using a rate constant appropriate to the type of microbe, again using conventional techniques. Through the use of conventional ray-trace algorithms, a computer model was used to calculate the intensity on the collecting plates in terms of the number, power, and location of the UV lamps, and the spacing, length, and reflectivity of the plate surface for the arrangement depicted in FIG. 5. Based on the lamp powers and locations with respect to the plates, the UV intensity arriving at the openings of the plate channels was predicted. Preferably, as depicted in FIG. 9, the lamps 50 are located to provide a relatively uniform illumination, depicted by the curve 5, across the different channel openings between plates 42, and reflector elements, for example highly reflective aluminum parabolic plates 60A, are positioned downstream of the lamps to direct the UV light back toward the plates 42 to further enhance illumination uniformity. For an arrangement of two lamps in a duct approximately 21½ inches in width, the optimal illumination uniformity predicted through such modeling, was provided with the two lamps, which were commercially available 5.8 watt UV lamps, disposed in spaced relationship approximately 10½ inches apart and positioned 6 inches downstream from the plate array.

Figure 10:
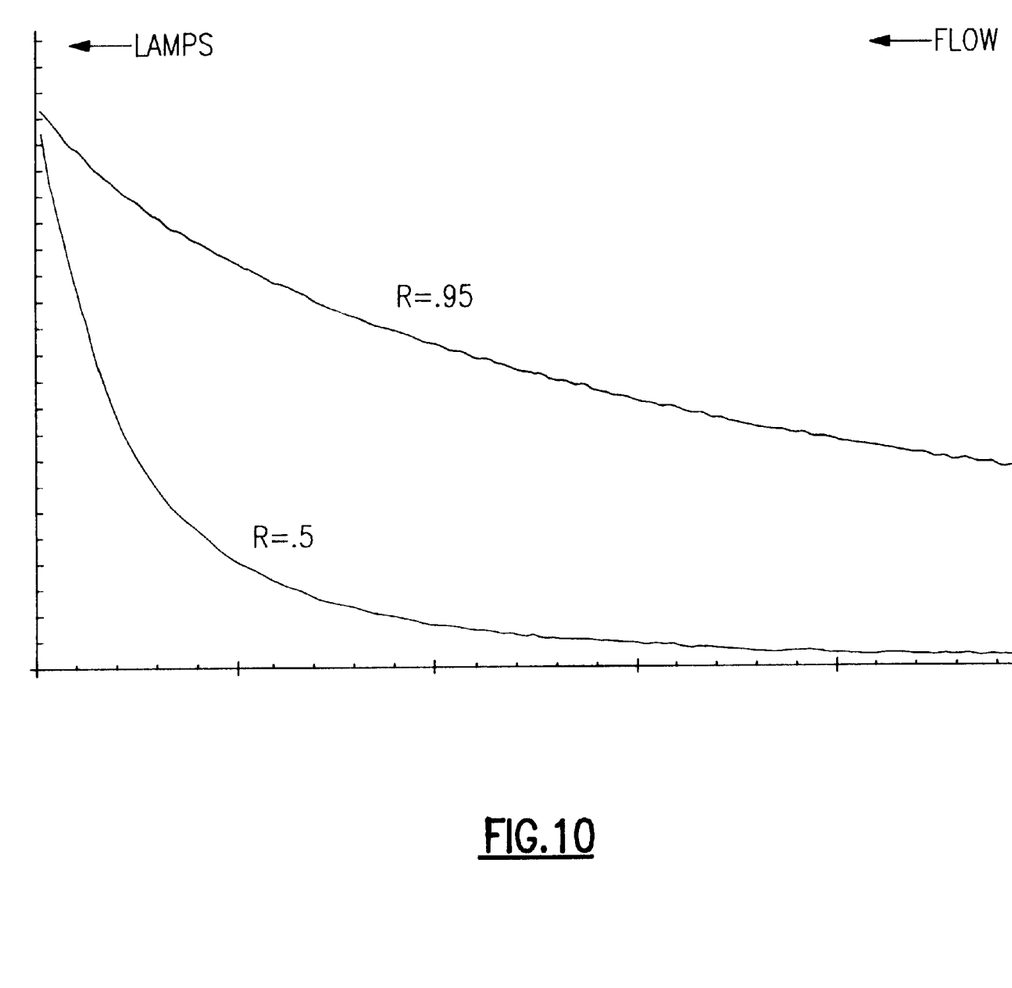
FIG. 10 is a graphical illustration representative of the light intensity profile over the depth of a collector plate from its trailing edge to its leading edge for plate reflectivities representative of a highly polished surface and of an oxidized surface.

The UV light intensity distribution over the surface of the collecting plates was also modeled based on the predicted UV light intensity at the channel mouth assuming diffuse illumination. Depending on the reflectivity of the surface, and the angle at which a photon enters the channel, a photon may undergo a number of specular reflections as it progresses down the channel. The calculated UV light intensity distribution for the aforenoted arrangement is depicted in FIG. 10 for two surface reflectivities, a first reflectivity of 0.5, which would be representative of an oxidized or contaminated surface, and a second reflectivity of 0.95, which would be representative of a smooth aluminum surface. For the higher reflectivity, a relatively more uniform plate surface illumination is predicted with the intensity dropping over a five inch span from about 4300 microwatt per square centimeter at the trailing edge of the plate to about 1500 microwatts per square centimeter at the leading edge of the plate. For the lower reflectivity, a rapidly deteriorating plate illumination is predicted with the intensity dropping over the five inch span from about 4300 microwatt per square centimeter at the trailing edge of the plate (the edge that is closest to the UV light source) to less than 1000 microwatts per square centimeter at only one inch from the trailing edge and then to less than 100 microwatts per square centimeter at the leading edge of the plate. Based on these predicted plate illumination intensities, the expected bioaerosol killing rate should be extremely high at all plate locations. For relatively low reflectivities, the disinfection rate would drop off rapidly from the trailing edge of the plates nearest the lamps. However, even in the case of low reflectivity plates, the low disinfection rates should still be sufficient exceed bioaerosol growth rates on the plates, thus ensuring no accumulation of bioaersols. An electrostatic precipitator air cleaner similar to the embodiment depicted in FIGS. 1 and 2 was constructed for test purposes. The test air cleaner had a conventional mechanical prefilter, an electrostatic precipitator cell equipped with 50 plates, each 14 inches tall and 5 inches deep, and a pair of ultraviolet lights laterally spaced about 12½ inches apart in a 21½ inch wide air passageway on opposite sides of the air passageway through the precipitator cell and position approximately 2 inches from the trailing edge of the plates. To load the collecting plates, the air flowing into and through the electrostatic precipitator was injected with dust doped with Cladosporium spores. The test results verified that the ultraviolet light was effective in disinfecting the particulate material collected on the plates of the electrostatic precipitator cell.

The percentage reduction may be increased to over 99% by increasing the intensity of light. The time of exposure of the spores to the electrostatic precipitator cell also impacts the effectiveness of the ultraviolet light in destroying spores. When configured with the two laterally spaced ultraviolet lights positioned relatively adjacent, in this case about 1⅜ inches from, the downstream end of the array of the collector plates, a 36% average reduction in viable spores on the collecting plates was attained after 15 minutes of exposure. After 10 hours of continuous operation of the ultraviolet lights, a 93.4% average reduction in viable spores on the collecting plates was achieved. There was essentially no reduction in the quantity of viable spores on the collecting plates after only one minute of exposure to the ultraviolet light.

The proximity of the source of ultraviolet light to the collector plates was also a factor in the effectiveness of the ultraviolet in disinfecting the particulate material on the collector plates. For example, when the ultraviolet lights were moved back to be about 24 inches from the downstream end of the collector plate array, rather than being relatively adjacent the downstream end of the collector plate array, the average reduction in viable spores on the collector plates dropped from about 36% to about 11% for an exposure period of 15 minutes. There was no variation in the effectiveness of disinfecting over the height of the plates. In general, the upstream portions of the collector plates, which are the portions further from the light source, exhibited lower levels of spore destruction than the downstream portions of the collector plates. Also, in a lateral direction, the level of spore reduction for comparable plate locations decreased as the distance of the plate from the ultraviolet light source increased.

What is claimed is:

1. An air cleaner assembly for removing particulate material that is entrained in an air stream passing therethrough, comprising:

a housing having an air stream inlet, an air stream outlet, and defining a flow passage extending therebetween along a longitudinal axis;

an electrostatic precipitator cell for removing particulate material from the air stream, said electrostatic precipitator cell including a plurality of collector plates disposed within the flow passage for collecting thereon particulate material from the air stream, said collector plates arrayed substantially parallel to said longitudinal axis;

at least one germicidal lamp operative to emit germicidal light, said at least one germicidal lamp disposed within said housing for irradiating said collector plates with germicidal light; and at least one light reflecting element for redirecting germicidal light having passed through said array of collector plates in a generally downstream direction to irradiate back upon said collector plates.

2. An air cleaner as recited in claim 1 wherein said at least one germicidal lamp is operative to emit ultraviolet light and said at least one light reflecting element has a relatively high reflectivity for light at wavelengths between 200 and 280 nanometers.

3. An air cleaner as recited in claim 1 wherein said at least one light reflecting element comprises an aluminum mesh element particulate prefilter for trapping relatively large particles.

4. An air cleaner as recited in claim 1 wherein said at least one light reflecting element comprises a plurality of laterally spaced light reflecting elements, each light reflecting element disposed at an acute angle with said longitudinal axis.

5. An air cleaner as recited in claim 4 wherein said at least one germicidal lamp is operative to emit ultraviolet light and each light reflecting element has a relatively high reflectivity for light at wavelengths between 200 and 280 nanometers.

6. An air cleaner as recited in claim 4 wherein each light reflecting element comprises an aluminum mesh strip.

7. An air cleaner as recited in claim 4 wherein each light reflecting element comprises a strip coated with a light reflective material.

8. An air cleaner as recited in claim 7 wherein the light reflective material comprises a light reflective tape.

9. An air cleaner as recited in claim 1 wherein said housing has at least one perimeter wall having a surface facing the flow passage therethrough, said surface comprising a light reflective surface.

10. An air cleaner assembly for removing particulate material that is entrained in an air stream passing therethrough, comprising:

a housing having an air stream inlet, an air stream outlet, and defining a flow passage extending therebetween along a longitudinal axis;

an electrostatic precipitator cell for removing particulate material from the air stream, said electrostatic precipitator cell including a plurality of collector plates disposed in spaced relationship in a parallel array within the flow passage for collecting thereon particulate material from the air stream and aligned substantially parallel to said longitudinal axis, a plurality of ionizer wires disposed in spaced relationship in the flow passage axially upstream with respect to air flow of said collector plates, and a power supply for providing an electrical charge to said ionizer wires and for providing positive and negative charges respectively to alternate collector plates of said array;

at least one germicidal lamp operative to emit ultraviolet, said at least one germicidal lamp disposed within said housing axially downstream with respect to air flow of said array of collector plates and positioned to irradiate said collector plates with ultraviolet light at an angle of incidence; and a particulate prefilter for trapping relatively large particles, said prefilter disposed axially upstream with respect to air flow of said ionizer wires, said prefilter formed of a plurality of laterally spaced light reflecting elements disposed at an acute angle with said longitudinal axis for redirecting ultraviolet light having passed through said array of collector plates in a generally downstream direction to irradiate back upon said collector plates, each light reflecting element formed of polished aluminum mesh having a relatively high reflectivity for light at wavelengths between 200 and 280 nanometers.

11. An air cleaner as recited in claim 10 wherein said at least one light reflecting element disposed downstream with respect to airflow of said at least one germicidal lamp comprises an arcuate plate of light reflective material disposed in operative association with said at least one germicidal lamp to reflect light emitted from said at least one germicidal lamp in a generally upstream direction.

12. An air cleaner as recited in claim 11 wherein said at least one arcuate light reflecting element has a contour following a parabolic arc.

13. An air cleaner as recited in claim 11 wherein said at least one arcuate light reflecting element has a contour following a cylindric arc.

14. An air cleaner assembly for removing particulate material that is entrained in an air stream passing therethrough, comprising:

a housing having an air stream inlet, an air stream outlet, and defining a flow passage extending therebetween along a longitudinal axis;

an electrostatic precipitator cell for removing particulate material from the air stream, said electrostatic precipitator cell including a plurality of collector plates disposed within the flow passage for collecting thereon particulate material from the air stream, said collector plates arrayed substantially parallel to said longitudinal axis;

at least one germicidal lamp operative to emit germicidal light, said at least one germicidal lamp disposed within said housing for irradiating said collector plates with germicidal light;

at least one light reflecting element disposed downstream with respect to airflow of said at least one germicidal lamp for directing germicidal light emitted from said at least one germicidal lamp in a generally upstream direction to irradiate upon said collector plates at an angle of incidence; and at least one light reflecting element disposed upstream with respect to airflow of said collector plates for redirecting germicidal light having passed through said array of collector plates in a generally downstream direction to irradiate back upon said collector plates.

15. An air cleaner assembly for removing particulate material that is entrained in an air stream passing therethrough, comprising:

a housing having an air stream inlet, an air stream outlet, and defining a flow passage extending therebetween along a longitudinal axis;

an electrostatic precipitator cell for removing particulate material from the air stream, said electrostatic precipitator cell including a plurality of collector plates disposed within the flow passage for collecting thereon particulate material from the air stream, said collector plates arrayed substantially parallel to said longitudinal axis;

at least one germicidal lamp operative to emit germicidal light, said at least one germicidal lamp disposed within said housing for irradiating said collector plates with germicidal light;

at least one light reflecting element for redirecting germicidal light having passed through said array of collector plates in a generally downstream direction to irradiate back upon said collector plates; and a filter for removing volatile organic compounds.

16. An air cleaner as recited in claim 15 wherein said filter for removing volatile organic compounds is disposed axially downstream with respect to air flow of said collector plates.

17. An air cleaner as recited in claim 15 wherein said filter for removing volatile organic compounds comprises a photocatalytic filter responsive to ultraviolet light for enhancing removal of volatile organic compounds.

* * * * *